May 24, 1966 W. A. WILSON 3,253,149
METHOD AND APPARATUS FOR HARDNESS TESTING
USING BACKSCATTERED BETA RADIATION
Filed Aug. 16, 1962 3 Sheets-Sheet 1

INVENTOR
Walter A. Wilson
BY
Munoy & Young
ATTORNEYS

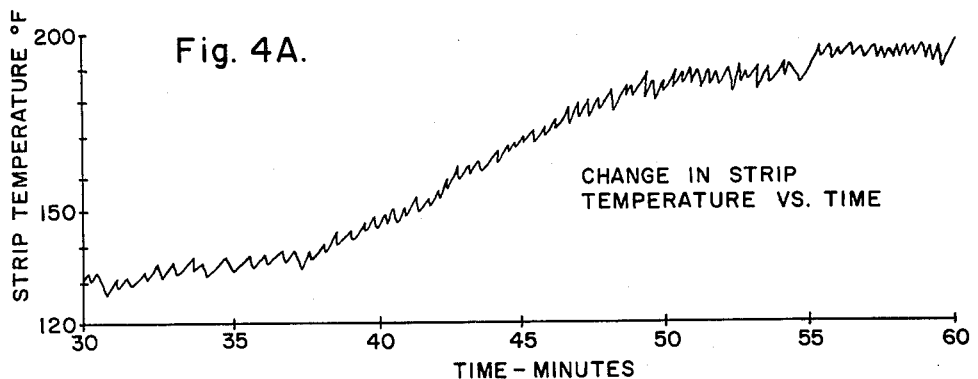
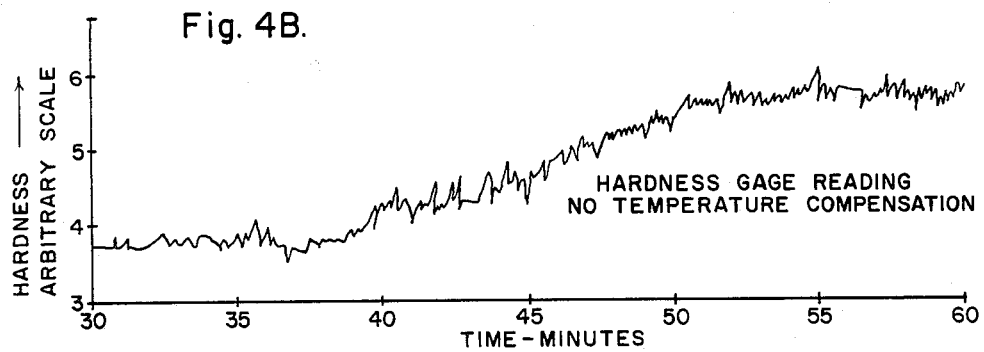
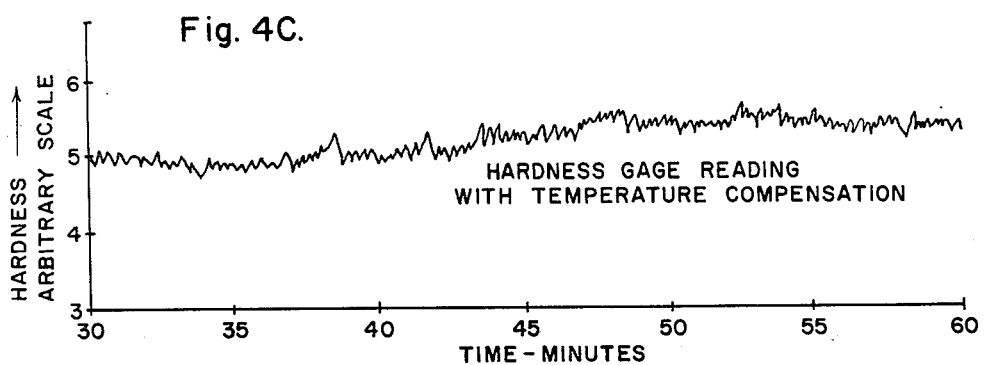

United States Patent Office 3,253,149
Patented May 24, 1966

3,253,149
METHOD AND APPARATUS FOR HARDNESS TESTING USING BACKSCATTERED BETA RADIATION
Walter A. Wilson, Pittsburgh, Pa., assignor to Jones & Laughlin Steel Corporation, Pittsburgh, Pa., a corporation of Pennsylvania
Filed Aug. 16, 1962, Ser. No. 217,345
17 Claims. (Cl. 250—83.3)

This invention relates to a method and apparatus for measuring the surface hardness of a metallic workpiece by the use of radioactive energy. More particularly, the invention relates to a hardness measuring system of the type described having an improved degree of accuracy and particularly adapted for use with moving workpieces which vary in temperature along their lengths.

In copending application Serial No. 828,358, filed July 20, 1959, which issued as U.S. Patent No. 3,025,709, and assigned to the assignee of the present application, a non-contacting system is disclosed for measuring the hardness of a metallic workpiece having a substantially homogeneous composition. In accordance with the invention described in that application, a beam of beta radiation is directed onto the surface of a workpiece which presents an infinite thickness to the beam, the reflected radiation or backscatter from the surface being detected to provide an electrical signal proportional to the intensity of the reflected radiation. In the usual case, the system includes a radioactive source of beta radiation positioned adjacent one side of the workpiece, and an ionization chamber positioned on the same side of the workpiece and adapted to detect backscattered radiation from the workpiece surface to produce an electrical signal which varies as a function of the amount of backscatter. Assuming that the workpiece presents an infinite thickness to the incident radiation, and that the temperature of the workpiece is fixed, the electrical signal can be made to vary as a function of the hardness of that workpiece. This electrical signal is then used in suitable circuitry for producing a visual indication of the actual hardness of the workpiece.

Although the temperature of a stationary workpiece will usually be constant, this is not the case with continuously moving workpieces, particularly when a heating step precedes the point at which hardness measurements are taken along a continuous processing line for metal strip material. For example, in annealing steel and other metal strip material, the temperature of the strip may vary over wide ranges on the order of several hundred degrees Fahrenheit; and since a change of 50° F. in the temperature of the strip will cause a change in the current at the output of the ionization chamber equal to a change of about two Rockwell "$R_{30T}$" points, it can readily be seen that temperature variations of this sort cannot be tolerated. Since the temperature of the strip cannot be controlled, some means of temperature compensation must be employed in the circuitry for converting the signal at the output of the ionization chamber into an accurate visual indication of hardness.

Therefore, as one object, the present invention provides a method and apparatus for compensating for temperature variations in a metallic workpiece on which hardness readings are obtained by the use of radioactive energy. In accordance with this aspect of the invention, a temperature measuring device is located at a fixed point adjacent the moving workpiece and in close proximity to the aforesaid ionization chamber for producing an electrical signal which varies as a function of the temperature of the workpiece as it passes thereby. As the temperature is being measured, the ionization chamber also produces an output signal proportional to the amount of backscatter, which backscatter and output signal are affected by the temperature of the strip. By combining the signal from the temperature measuring device with that from the ionization chamber in suitable circuitry, the signal from the temperature measuring device can be made to compensate for temperature variations whereby a resultant signal is produced which is proportional to the true hardness of the strip independent of any temperature variations.

Aside from the temperature of the workpiece itself, an even more serious factor affecting hardness readings obtained from a beta radiation gage is the density of the air between the ionization chamber and the workpiece. In the case of a moving metallic workpiece of varying temperature such as is experienced at the output of an annealing furnace, this problem is particularly acute since the temperature of the air and, hence, its density may vary over wide ranges. In this respect, it has been found that a variation in the temperature of the air between the workpiece and the ionization chamber of only 1° F. can cause an error of 0.6 "$R_{30T}$" Rockwell points in the reading of the gage.

Therefore, as another object, the present invention provides a means for maintaining the density of the air constant between a hardness beta radiation gage and the surface of the workpiece on which hardness readings are taken. In accordance with this aspect of the invention, heated air is blown across the space between the beta gage and the workpiece above a certain critical rate, the temperature of the air being maintained constant by means of a servo system including a temperature measuring device in the stream of air passing between the gage and the workpiece, and heating means controlled by the temperature measuring device for maintaining the temperature of the air stream constant.

The above and other objects and features of the invention will become apparent from the following detailed description taken in connection with the accompanying drawings which form a part of this specification, and in which.

Figure 3:
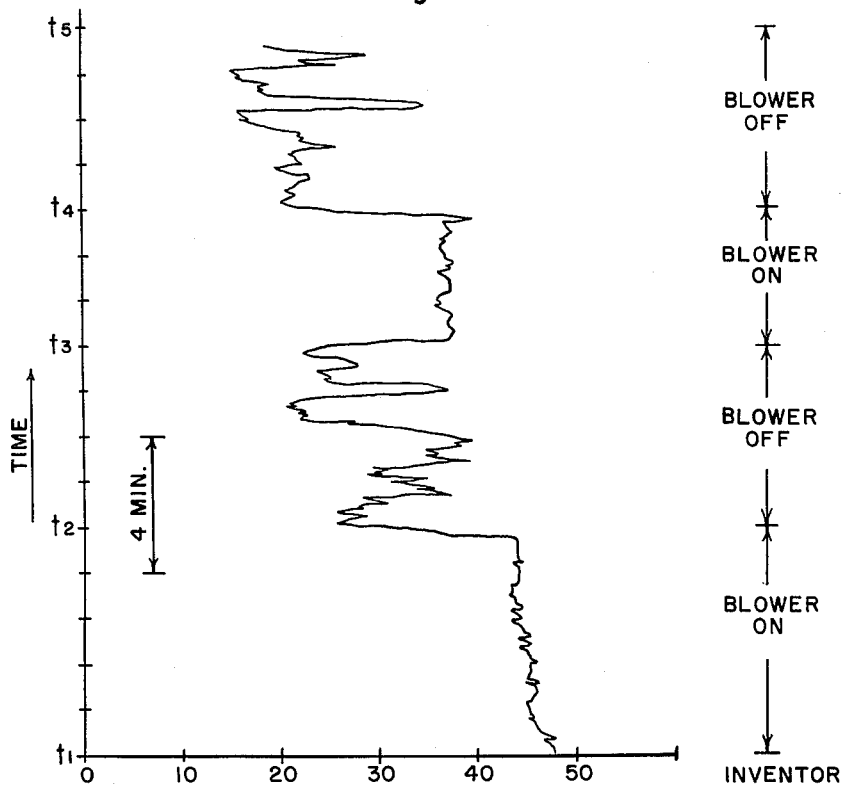

FIG. 3 is a graph illustrating the effect of changes in temperature (i.e., density) of the air between the workpiece on which hardness measurements are being taken and the ionization chamber mentioned above; and FIGS. 4A, 4B and 4C are graphs illustrating the effect of temperature variations in a workpiece on hardness reading obtained by the use of backscatter radiation as contrasted with the effect of the temperature compensation system of the invention.

Figure 1:
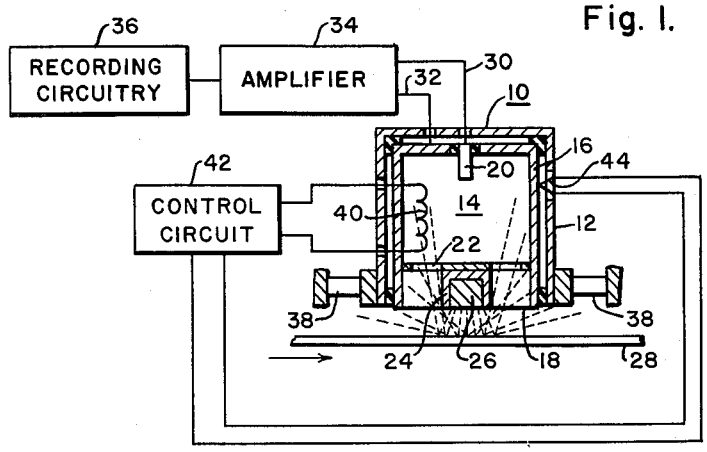
FIGURE 1 shows an illustrative embodiment of one type of radioactive energy source and ionization chamber used in the present invention to detect backscatter from a metallic workpiece which presents an infinite thickness to beta rays from the radioactive source.

Referring now to the drawings, and particularly to FIG. 1, there is shown a beta radiation gage 10 which comprises an outer cover or shield 12 within which is positioned an ionization chamber 14. The ionization chamber comprises a cylindrical shell 16, the bottom end of which is provided with a window 18 through which beta rays may pass. This window may, for example, take the form of a thin stainless steel sheet or possibly a sheet of plastic material. The ionization chamber 14 is filled with an inert gas such as argon such that when beta rays enter the chamber, ionization takes place and an electric current flows between the outer metallic shell 16 and an electrode 20 which extends downwardly into the center of the chamber.

Supported within the shell 16 by means of an annular spider 22 or the like is a container 24 of lead or other similar shielding material containing a slug of radioactive material 26. The lower end of container 24 is not shielded so that beta rays emanating from the slug 26 will impinge upon a traveling metallic workpiece 28 which, in the embodiment of the invention shown, is positioned beneath the radioactive material 26. The backscatter from these rays is then collected in chamber 14 to generate an electrical current between the outer shell 16 of the chamber and electrode 20. This electrical current is then applied through leads 30 and 32 to an amplifier 34 which amplifies the signal and then passes it to recording circuitry 36 which converts the electrical current into a visual indication having a magnitude proportional to the magnitude of the electrical current.

Generally speaking, the radioactive material 26 will emit not only beta particles which are negatively charged electrons traveling at great speed, but also positively charged electrons (positrons), alpha particles and gamma rays. The alpha particles are positively charged helium nuclei and the gamma rays are short wave length X-rays. The present invention is concerned only with the beta particles; and in this respect it has been found that if the strip 28 presents an "infinite thickness" to the beta rays from the slug 26, the amount of backscatter received in chamber 14 and the electrical current generated thereby will be a function of the hardness of the strip.

When reference is made to an "infinite thickness" of the strip 28, it means, in essence, that thickness where a beta particle of a given energy will not be capable of again reaching the surface of the material should penetration to that depth thickness occur. That is, the "infinite thickness" is the saturation thickness which is one-half the range of the betas in the scatter. The one-half factor is due to the double path length of the scattered betas, one-half the range in and one-half out. Thus, at the saturation or infinite thickness, penetration through the material can occur without any apparent change in backscatter.

In order for the apparatus to function satisfactorily, the strip 28 must be kept as flat as possible or of constant curvature since variations in curvature will cause inaccurate readings due to variations in the angle of incidence of the beta rays on the sheet. Furthermore, the gage 10 must be fixed at a spaced distance from the strip 28; and, accordingly, supports 38 are provided for this purpose.

In the processing of strip material, randomly oriented magnetic fields may be induced therein. If the strip 28 happens to be stationary, these magnetic fields will materially affect any hardness readings obtained with the result that the accuracy of the apparatus will be beneath the requirements for a usable hardness measuring device. When, however, the speed of the strip 28 exceeds a certain rate, the randomly oriented magnetic fields tend to compensate one for the other with the result that they do not materially affect hardness readings. Therefore, if the workpiece 28 is stationary or moving below a certain speed, it must be essentially demagnetized (i.e., loses its permanent magnetism). Actually, in the case of an annealing line where the strip passes through a furnace and is heated above a certain temperature (1100° F. for low carbon steel), it automatically becomes essentially demagnetized, so that magnetization does not become a problem.

In the processing of steel strip material, it often happens that a magnetic crane is used to pick up coils. In this process, essentially the same magnetizing force is applied in picking up each coil with the magnetic crane. If, however, one of the coils is not picked up by a magnetic crane, and should the random fields within the magnetized coil be compared with those in the coil that has not been picked up by the crane, a great difference may exist. This difference will be due to the preferred direction of magnetism being random only in a general sense and having a specific average trend. That is to say, the unmagnetized coil will have one average; whereas the magnetized coil will have another average when monitored by the beta equipment and traveling above a certain critical speed. Thus, an error will exist in the readings unless all coils are picked up or otherwise come under the influence of the magnetic crane so that the fields in all coils are approximately of the same magnitude.

As was mentioned above, the density of the air or other gas through which the beta rays pass will affect the amount of backscatter and, hence, the current produced by the ionization chamber. Accordingly, a heating coil, schematically indicated as 40 in FIG. 1 is provided outside the ionization chamber 14 to maintain the temperature and, hence, the density of the inert gas therein constant. The heating coil 40 is connected as shown to a control circuit 42, this circuit being controlled, in turn, by a thermocouple 44 which measures the temperature of the air outside the ionization chamber 14, the arrangement being such that when the temperature varies a control signal will be applied to circuit 42 from the thermocouple 44 to either increase or decrease the current through the heating coil 40.

Figure 2:
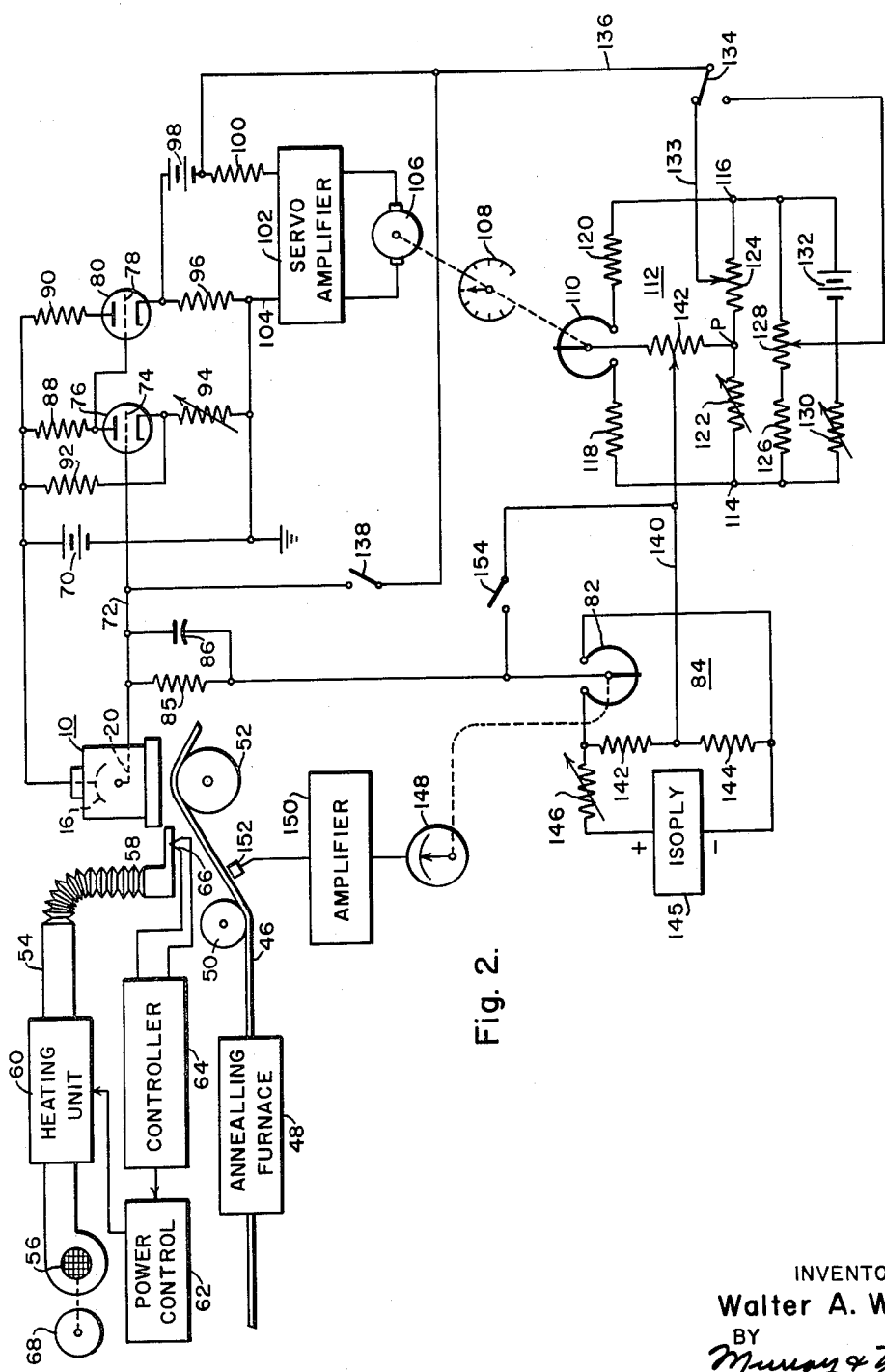
FIG. 2 is a detailed schematic diagram of an illustrative embodiment of the system of the invention for controlling the density of the air between an ionization chamber and a traveling workpiece, as well as the system for compensating for changes in workpiece temperature.

Referring now to FIG. 2, the system of the present invention is shown wherein the hardness of continuously moving metal strip material 46 is determined. In the particular embodiment of the invention shown, it is assumed that the strip 46 initially passes through an annealing furnace 48 where it is heated above a temperature at which the strip, as it emerges from the annealing furnace, is essentially demagnetized. Thereafter, the strip passes beneath roll 50 and above roll 52 such that it is maintained taut and of constant curvature so as to maintain a constant, fixed distance between the surface of the strip above the roll 52 and the lower edge of the radiation detector 10. The spacing between the lower edge of the radiation detector 10 and the surface of strip 46 above the roll 52 is critical in that there is a distance which gives maximum sensitivity of the detector for a given geometry. At this certain critical distance, a plateau is reached which extends for about plus or minus 20 mils on either side of the exact distance of best response. This plateau must be found experimentally for a given installation geometry. In an installation similar to that shown in FIG. 2, the distance is approximately ⅞ inch.

As will be understood, the temperature of the strip 46 may vary over wide ranges after passing through the annealing furnace 48. Consequently, the density of the air between the strip and detector will also vary, meaning that in the absence of some type of means for maintaining the density of the air constant, substantial errors will be introduced in the hardness readings as was explained above.

In accordance with one aspect of the present invention, the density of the air between the detector 10 and strip 46 is maintained constant by means including a duct 54 having its inlet end connected to the output of a motor-driven blower 56 and its outlet end 58 terminating at the edge of the space between the radiation detector 10 and the surface of strip 46. Inserted into the duct 54 between its inlet and outlet ends is an electrical heating unit 60 which includes an electrical heating coil supplied with power from circuit 62. The circuit 62, in turn, is controlled by means of an electrical controller 64, which controller is adjusted or regulated by means of a thermocouple 66 or other suitable temperature measuring device at the outlet end 58 of the duct 54.

In the operation of the device, the blower 56 is continuously driven by means of motor 68 during the time that hardness measurements are being taken whereby a constant stream of air is forced across the space between the detector 10 and the surface of strip 46. The speed of blower 56 and the flow of air through duct 54 is adjusted to a value sufficiently large in order that the anticipated changes in the temperature of strip 46 will heat only a layer of air above the strip which is so thin that the change in air density due to this heating will have only a negligible effect upon the hardness readings. That is, a very thin film of air above the strip 46 will change in temperature and density, notwithstanding the fact that an air stream is blown or forced across the major portion of the space between the detector 10 and strip 46. This thin air film, however, is maintained as small as possible. The predetermined air flow is continuously monitored by the thermocouple or other temperature measuring device 66. Any detected change in air temperature is immediately detected and corrected by the controller circuit 64 which regulates the power control circuit 62 so as to increase or decrease the current passing through the coils in heating unit 60, depending upon whether the temperature of the air at the outlet end 58 increases or decreases. In this manner, the system guarantees that the air density between the strip and detector remains substantially constant so as to eliminate errors in hardness readings due to any changes in density. Preferably, the air temperature is maintained at about 150° F. while the air flow from the blower is 1000 cubic feet per minute with a spacing between the detector 10 and strip 46 of ⅞ inch. It should be pointed out, however, that any constant air flow above about 600 cubic feet per minute will produce the same results; while any air flow below this value will not. Thus, it has been found that an air flow of at least about 600 cubic feet per minute is a critical value below which the system will not perform satisfactorily so as to maintain the density of the air between the detector and strip constant.

The effect of maintaining the density and temperature of the air between the detector 10 and strip 46 constant is shown in FIG. 3 wherein the response of gage 10 is plotted against time for conditions wherein the blower 56 is on or off. Thus, between times $T_1$ and $T_2$ the blower 56 is on with the gage response being substantially constant at a reading of about 45. From times $T_2$ to $T_3$ the blower 56 was turned off and it will be noted that the gage response is erratic and differs widely from that obtained with the blower on due to the fact that the temperature and density of the air above the strip is changing due to temperature variations in the strip. Between times $T_3$ and $T_4$, the blower 56 was again turned on with the result that the hardness readings are again constant. Although those readings differ from the ones obtained between times $T_1$ and $T_2$, this is due to a change in the hardness of the strip. Finally, between times $T_4$ and $T_5$, the blower 56 was again turned off with the result that the hardness readings are again erratic and unusable.

Reverting again to FIG. 2, the metallic shell 16 is connected to the positive terminal of a battery 70, the negative terminal of this battery being grounded as shown. The electrode 20 is connected through lead 72 to the grid 74 of a first amplifier tube 76; and the anode of amplifier 76 is connected to the grid 78 of a cathode follower 80. Connected between the grid 74 of amplifier 76 and a movable tap on a potentiometer 82 in a temperature compensating bridge circuit 84 is a resistor 85 of high ohmage. In shunt with the resistor 85 is a capacitor 86. The anodes of tubes 76 and 80 are connected through resistors 88 and 90, respectively, to the positive terminal of battery 70; while the cathode of tube 76 is also connected to the positive terminal of battery 70 through resistor 92, the ohmage of resistor 92 being greater than that of resistor 88. Connecting the cathode of tube 76 to ground is a variable resistor 94, while a somewhat similar resistor 96 connects the cathode of tube 80 to ground.

Connected to the cathode of tube 80 is the positive terminal of a battery 98, the negative terminal of this same battery being connected through resistor 100 to one input terminal of a conventional servo amplifier 102. The other input terminal of amplifier 102 is connected to ground through lead 104, substantially as shown. The servo amplifier 102 is used to drive a servomotor 106, the arrangement being such that when the signal applied to the servo amplifier 102 increases, the servomotor 106 will be caused to rotate in one direction; whereas when the signal decreases, the servomotor will be caused to rotate in the opposite direction. The servomotor 106 is mechanically connected as shown to the dial of a hardness gage 108 as well as the movable tap on a potentiometer 110 included in a compensating bridge network 112, the purpose of which will hereinafter be explained. Between the input terminals 114 and 116 of the network 112 are two current paths, one of which includes the resistor of potentiometer 110 and resistors 118 and 120 in series. The other current path of the bridge network includes resistors 122 and 124. Connected in shunt with resistors 122 and 124 is a current path including resistors 126 and 128, as well as a second current path including variable resistor 130 and battery 132. The resistors 124 and 128 are provided with movable taps thereon, these taps being adapted for alternate connection through switch 134 to lead 136 and the negative terminal of battery 98. Lead 136 and the negative terminal of battery 98 are also adapted for connection through normally open switch 138 to the grid 74 of amplifier 76.

The circuit is completed from the bridge network 112 to bridge network 84 through lead 140, this lead being connected through a movable tap to a resistor 142 which is connected between the movable tap on potentiometer 110 and the junction of resistors 122 and 124. As will be seen, the bridge network 112 acts as a source of variable voltage in the circuit between leads 140 and 133, the magnitude and polarity of this voltage being dependent upon the position of the movable tap on potentiometer 110 and, hence, the reading on hardness gage 108.

The lead 104 from bridge network 112 is connected to the junction of resistors 142 and 144 in the temperature compensating bridge network 84. Driving potential for the bridge network 84 is supplied by an Isoply voltage source 145 having its negative terminal connected to one end of resistor 144 and one end of the resistor of potentiometer 82, and its positive terminal connected through variable resistor 146 to one end of resistor 142 and the other end of the resistor of potentiometer 82. With the arrangement shown, it can be seen that the resistors 142 and 144 comprise two of the four impedances of the bridge network, while portions of the resistor of potentiometer 82 on either side of its movable tap comprise the other two of the four impedances. The temperature compensating network 84, like network 112, comprises a source of variable voltage inserted into the circuit between lead 140 and resistor 85, the magnitude and polarity of the voltage being dependent upon the position of the movable tap on potentiometer 82. This movable tap is connected, as shown, to a temperature gage 148. The gage 148 is connected by means of an amplifier 150 to a temperature measuring device 152 which senses the temperature of the strip 46 in close proximity to the beta radiation gage 10. Thus, as the temperature of the strip 46 changes, the position of the indicator on temperature gage 148 will change as will the position of the movable tap of potentiometer 82 to change the magnitude and/or polarity of the voltage inserted into the circuit by temperature compensating bridge network 84.

Any suitable temperature measuring device 152 may be employed in the present invention which can accurately sense the temperature of the strip 46 as it passes thereby. One type of temperature measuring device which will operate satisfactorily for this purpose is a Thermodot (trademark) which is a radiation thermometer manufactured by Radiation Electronics Co., Chicago, Illinois.

From a consideration of the circuitry of FIG. 2, it can be seen that the system including the radiation detector 10, amplifiers 76, 80 and 102, and bridge networks 112 and 84 comprise a servo loop wherein a change in backscatter above or below a predetermined value will cause rotation of the servomotor 106 in one direction or the other. The successful operation of the servo system depends, of course, upon the application of a negative fedback or bucking voltage to the input of amplifier 76 such that a change in the amount of backscatter will result in a change in the feedback voltage until it is equal and opposite to the input signal from the detector 10. When the input and feedback signals are equal, the servomotor 106 and the gage 108 connected thereto will stop at a position indicating the new backscatter condition and the resulting hardness of the strip 46.

In order to obtain hardness readings the system must be initially calibrated, and for this purpose amplifiers 76 and 80 are "zeroed" for no input, as in the case when no radiation reaches the detector 10. This condition can be brought about by closing the switch 138 and adjusting the zero potentiometer 94 until the hardness meter 108 reads zero. This adjusts the system for an operating level such that there is zero output for zero input.

After the system is thus zeroed, it must be standardized and calibrated, and for this purpose the switches 134, 154 and bridge circuit 112 are employed. In order to standardize the circuit, the switch 154 is closed to short out the temperature bridge 84. The bridge circuit 112 is balanced by means of variable resistor 122 so that when the tap on potentiometer 110 is in its center of travel, there is no voltage across resistor 142, the sensitivity potentiometer. Henceforth, the bridge circuit ceases to function strictly as a bridge, and becomes a continuously variable voltage source.

The total voltage output of the bridge 112 is the algebraic difference between two voltages with respect to point P in the middle of the bridge. First, there is a voltage on the movable tap of resistor 124, which is positive with respect to point P and capable of being varied from zero to a maximum as the tap on resistor 124 is varied. When the tap on potentiometer 110 is at its center of travel, its potential is the same as point P. If this tap (i.e., on potentiometer 110) is moved from the center by servomotor 106, a voltage appears of a sign and magnitude depending upon the distance and direction that the tap is moved from its center point. The portion of this voltage which is subtracted from the voltage on the tap of resistor 124 depends upon the setting of the sensitivity potentiometer 142. The total output voltage, then, is the difference between the voltages at the arms of potentiometers 124 and 142.

In the process of calibration, the tap on resistor 128 is adjusted such that the voltage thereon is exactly equal to that on the tap of resistor 124 when it is moved to its extreme right-hand position shown in FIG. 2. This may be achieved, for example, by initially moving the tap on resistor 124 to its extreme right-hand position with switch 134 in the position shown and by adjusting resistor 130 until the meter 108 reads zero. Theerafter, the switch 134 is reversed from its position shown and the tap on resistor 128 varied until the meter again reads zero. Thereafter, any change in the circuit parameters will be indicated by a reading other than zero on gage 108 when the switch 134 is reversed from its position shown. Thereafter, the switch 134 connects lead 136 to lead 133, and with a specimen of known hardness beneath the radiation gage 10, the resistor 124 and/or 142 is adjusted such that the gage 108 reads at a convenient point, say center scale. When the strip 46 passes beneath the gage, its hardness above or below the hardness of the known sample will be indicated by a position of the gage 108 above or below center scale, respectively. After calibration and standardization, the switch 154 is again opened whereby the temperature compensating bridge 84 is inserted into the circuit.

After resistor 128 is adjusted to the point where the voltage at its arm is equal to the voltage at the arm of resistor 124, when resistor 124 is at its maximum position, the switch 134 is thrown to the standardize position and resistor 130 is adjusted until the bucking voltage is equal to the voltage developed across resistor 85 when the surface of a standard plate of infinite thickness is presented to the source detector. Any error that can be considered to be of a source type will be corrected during normal gage use by placing the standard plate beneath the source detector and adjusting resistor 130 to bring the original calibration into effect. The complete standardization of the equipment is accomplished first by adjusting the electronics until zero output is obtained for zero input and secondly adjusting resistor 130 until a known standard output is obtained from a known standard.

Referring now to the temperature compensation bridge 84, it is designed to produce zero compensating voltage between resistor 85 and lead 140 at the center of the measured temperature range (i.e., when the tap on potentiometer 82 is centered). The range of the meter 148 may, for example, be from 0° F. to 400° F. Thereafter, at a strip temperature of 200° F., zero compensation is inserted in series with the high megohm resistor 85 and the bucking voltage of the bridge network 112. The value of 200° F. may be assumed as the approximate average strip temperature over long periods of operation. Resistor 146 is adjusted such that as the strip temperature decreases toward 0° F., a positive voltage compensation equal to one "$R_{30T}$" Rockwell hardness point per 25° F. is inserted into the circuit. On the other hand, as the strip temperature increases toward 400° F., a negative voltage compensation equal to one "$R_{30T}$" Rockwell hardness point per 25° F. is inserted.

The effect of temperature compensation is illustrated in FIGS. 4A–4C. In FIG. 4A, the strip temperature is plotted against time, and it will be noted that the temperature of the strip at the output of an annealing furnace changes from about 130° F. to almost 200° F. in a period of sixty minutes. Remembering that a change in two Rockwell "$R_{30T}$" points occurs for a change in strip temperature of 50° F., the gage, without temperature compensation, would inherently produce erroneous readings. In FIG. 4B, the hardness reading from gage 108 is plotted against time for the case where no temperature compensation is employed for a strip having a substantially constant hardness, and it will be noted that a wide variation in readings occurs. In FIG. 4C, the chart divisions are again plotted against time, but in this case the temperature compensating bridge 84 is employed such that the signal from the beta gage 10 and that from the bridge 84 are electronically added to compensate for strip temperature variation, the chart reading being substantially constant to coincide wtih the substantially constant hardness of the strip.

It can thus be seen that the present invention provides a method and apparatus for eliminating errors in a hardness testing system which occur because of changes in the temperature of the workpiece and changes in the temperature and/or density of the air between the radiation detecting head and the workpiece. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In apparatus for measuring the hardness of a metallic workpiece including means for bombarding the surface of the workpiece with beta rays of such nature that the workpiece presents an infinite thickness to the rays, means spaced from the workpiece for detecting the backscatter resulting from such bombardment, and means for converting the detected backscatter into an indication of the hardness of said workpiece; the improvement of means for maintaining the density of the air between the surface of the workpiece and said detecting means constant comprising a device for blowing a constant stream of air into the space between the surface of the workpiece and said detecting means, and apparatus including a temperature measuring device in said stream of air for maintaining the temperature of said stream of air constant.

2. In apparatus for measuring the hardness of a metallic workpiece including means for bombarding the surface of the workpiece with beta rays of such nature that the workpiece presents an infinite thickness to the rays, means spaced from the workpiece for detecting the backscatter resulting from such bombardment, and means for converting the detected backscatter into an indication of the hardness of said workpiece; the improvement of means for maintaining the density of the air between the surface of the workpiece and said detecting means constant comprising a device for blowing a constant stream of air at an air flow rate above about 600 cubic feet per minute across the space between the surface of the workpiece and said detecting means, and apparatus including a temperature measuring device in said air stream for maintaining the temperature of said air stream constant.

3. In apparatus for measuring the hardness of a metallic workpiece including means for bombarding the surface of the workpiece wtih beta rays of such nature that the workpiece presents an infinite thickness to the rays, means spaced from the workpiece for detecting the backscatter resulting from such bombardment, and means for converting the detected backscatter into an indication of the hardness of said workpiece; the improvement of means for maintaining the density of the air between the surface of the workpiece and said detecting means constant comprising an air duct having a blower at one end and a discharge opening at the other end located adjacent the space between the surface of the workpiece and said detecting means whereby air forced through said duct by the blower will flow across said space, air heating means in the air duct, an air temperature measuring device at said other end of the duct adjacent said space, and means responsive to the temperature measured by said temperature measuring device for controlling said air heating means to maintain the temperature of the air blown across said space constant.

4. A hardness measuring system for a material having a substantially uniform composition comprising a source of beta radiation of such nature that the material will present an infinite thickness with respect to said radiation, means for directing said radiation toward said material, a radiation detector spaced from said material for receiving reflected radiation returned backwardly from the material, means connected to said detector for generating a signal which varies as a function of said reflected radiation, a device for blowing a constant stream of air into the space between said detector and the material, and apparatus including a temperature measuring device in the air stream for maintaining the temperature and density of said air stream constant.

5. The method of utilizing a nuclear radiation reflection gage to obtain a useful indication of the unknown hardness characteristic of a metallic workpiece having a substantially constant homogeneous composition, which comprises mounting in said gage a source of nuclear radiation having an energy characteristic such that said workjiece presents an infinite thickness to said radiation, mounting said gage alongside the path of travel of said workpiece such that the gage is spaced from the workpiece, constraining said workpiece following said path to a fixed distance from said gage, continuously indicating the hardness of said workpiece as a function of the reading of said gage, and blowing a constant stream of air of fixed temperature across the space between the gage and the workpiece from one edge of the gage to its opposite edge.

6. Apparatus for measuring the hardness of a continuously moving metallic workpiece having a substantially homogeneous composition comprising a nuclear source of beta radiation, means for positioning said source of beta radiation adjacent one side of said moving workpiece with the source being such that the workpiece presents an infinite thickness to beta rays therefrom, a radiation detector positioned adjacent said one side of the workpiece to receive reflected radiation returned backwardly from said material, circuit means connected to said detector for developing a first signal which varies as a function of the amount of reflected radiation, a temperature measuring device located at a fixed point adjacent the moving workpiece for producing a second signal which varies as a function of the temperature of the workpiece as it passes said device, and means in said circuit means for electrically combining said first and second signals to produce a third signal which varies as a function of the hardness of the workpiece adjacent the detector independently of temperature variations in the workpiece.

7. Apparatus for measuring the hardness of a continuously moving metallic workpiece having a substantially homogeneous composition comprising a nuclear source of beta radiation, means for positioning said source of beta radiation adjacent one side of said moving workpiece, a radiation detector positioned adjacent said one side of the workpiece to receive reflected radiation returned backwardly from said material, circuit means connected to said detector for developing a first signal which varies as a function of the amount of reflected radiation, a temperature measuring device located at a fixed point adjacent the moving workpiece for producing a second signal which varies as a function of the temperature of the workpiece as it passes said device, means in said circuit means for electrically combining said first and second signals to produce a third signal which varies as a function of the hardness of the workpiece adjacent the detector independently of temperature variations in the workpiece, and a device responsive to said third signal for indicating the hardness of said workpiece.

8. Apparatus for measuring the hardness of a continuously moving metallic workpiece having a substantially homogeneous composition comprising a nuclear source of beta radiation, means for positioning said source of beta radiation adjacent one side of said moving workpiece with the source being such that the workpiece presents an infinite thickness to beta rays therefrom, a radiation detector positioned adjacent said one side of the workpiece to receive reflected radiation returned backwardly from said material and adapted to develop a current which varies as a function of the amount of reflected radiation, and a servo system for converting said current into a visual indication of the hardness of said workpiece beneath the detector independently of temperature variations in the moving workpiece.

9. Apparatus for measuring the hardness of a continuously moving metallic workpiece having a substantially homogeneous composition comprising a nuclear source of beta radiation, means for positioning said source of beta radiation adjacent one side of said moving workpiece with the source being such that the workpiece presents an infinite thickness to beta rays therefrom, a radiation detector positioned adjacent said one side of the workpiece to receive reflected radiation returned backwardiy from the workpiece and adapted to develop a current which varies as a function of the amount of reflected radiation, a servo system for converting said current into a visual indication of the hardness of said workpiece adjacent the detector, and means in the servo system for compensating for a variation in the temperature of the workpiece as it passes said detector whereby the hardness indicated by the servo system will be the true hardness of the workpiece independent of temperature variations therein.

10. The apparatus of claim 9 wherein the means for compensating for a variation in the temperature of the workpiece comprises a temperature sensing device located in close proximity to the moving workpiece adjacent said detector and adapted to produce an electrical signal which varies as a function of the temperature of the workpiece, a bridge circuit in the servo system in which at least one of the four impedances of the bridge is varied by mechanical movement of an element, and means responsive to said electrical signal which varies as a function of the temperature of the workpiece for moving said element to thereby change the conditions under which the bridge is balanced.

11. Apparatus for measuring the hardness of a continuously moving metallic workpiece having a substantially homogeneous composition comprising a nuclear source of beta radiation, means for positioning said source of beta radiation adjacent one side of said moving workpiece with the source being such that the workpiece presents an infinite thickness to beta rays therefrom, a radiation detector positioned adjacent said one side of the workpiece to receive reflected radiation returned backwardly from said workpiece and adapted to develop a current which varies as a function of the amount of reflected radiation, a servo system for converting said current into mechanical rotation of a servomotor, a hardness indicator operatively connected to said servomotor, and means in the servo system for compensating for a variation in the temperature of the workpiece as it passes said detector whereby the hardness indicated by said indicator will be the true hardness of the workpiece independent of temperature variations therein.

12. Apparatus for measuring the hardness of a continuously moving metallic workpiece having a substantially homogeneous composition comprising a nuclear source of beta radiation, means for positioning said source of beta radiation adjacent one side of said moving workpiece with the source being such that the workpiece presents an infinite thickness to beta rays therefrom, a radiation detector positioned adjacent said one side of the workpiece to receive reflected radiation returned backwardly from said material and adapted to develop a current which varies as a function of the amount of reflected radiation, a servo system for converting said current into mechanical rotation of a servomotor, a hardness indicator operatively connected to said servomotor, and means in the servo system for compensating for a variation in the temperature of the workpiece as it passes said detector whereby the hardness indicated by the servo system will be the true hardness of the workpiece independent of temperature variations therein, said temperature compensating means comprising a temperature measuring device located in close proximity to said moving workpiece adjacent said detector and adapted to produce an electrical signal which varies as a function of the temperature of the workpiece, a bridge circuit having its two output terminals connected in series with the servo system, a source of voltage connected to the input terminals of said bridge circuit, at least one of the four impedances of the bridge circuit being varied by mechanical movement of an element, and means responsive to said electrical signal which varies as a function of the temperature of the workpiece for moving said element.

13. The method of measuring the hardness of a metallic workpiece having a substantially constant homogeneous composition, which comprises directing onto a surface of said workpiece a beam of beta radiation having an energy characteristic such that said workpiece presents an infinite thickness to said beam, detecting the reflected radiation returned backwardly from said surface to provide a first electrical signal proportional to the intensity of said reflected radiation, measuring the temperature of said metallic workpiece to produce a second electrical signal proportional to the temperature of the workpiece, electrically combining said first and second signals to produce a third signal which varies as a function of the hardness of said workpiece independently of temperature variations therein, and indicating the hardness of said workpiece as a function of said third signal.

14. The method of measuring the hardness of a moving metallic workpiece having a substantially constant homogeneous composition, which comprises directing onto a surface of said workpiece a beam of beta radiation having an energy characteristic such that said workpiece presents an infinite thickness to said beam, detecting the reflected radiation returned backwardly from said surface to provide a first electrical signal proportional to the intensity of said reflected radiation, measuring the temperature of said metallic workpiece adjacent said beam of beta radiation to produce a second electrical signal which varies as a function of the temperature of the workpiece, and electrically combining said first and second signals to produce a third signal which varies as a function of the hardness of said workpiece independently of temperature variations therein.

15. Apparatus for measuring the hardness of a continuously moving metallic workpiece having a substantially homogeneous composition comprising a nuclear source of beta radiation, means for positioning said source of beta radiation adjacent one side of said moving workpiece with the source being such that the workpiece presents an infinite thickness to beta rays therefrom, a radiation detector positioned adjacent said one side of the workpiece and spaced therefrom to receive reflected radiation returned backwardly from said material, circuit means connected to said detector for developing a first current which varies as a function of the amount of reflected radiation, a temperature measuring device located at a fixed point adjacent the moving workpiece for producing a second current which varies as a function of the temperature of the workpiece as it passes said device, means in said circuit means for electrically combining said first and second currents to produce a third current which varies as a function of the hardness of the workpiece adjacent the detector independently of temperature variations in the workpiece, and means for forcing a stream of air of constant density into the space between the workpiece and said detector.

16. The apparatus of claim 15 wherein said means for forcing a stream of air of constant density into the space between said workpiece and the detector comprises a blower, a duct having one end connected to the output of said blower and its other end terminating at the edge of the space between said workpiece and said detector, heating means in said duct for heating the air passing therethrough, a temperature measuring device at said other end of the duct for measuring the temperature of the air therein, and means responsive to the temperature measured by said latter-mentioned temperature measuring device for controlling said heating means whereby the temperature of the air blown across said space between the detector and workpiece is maintained constant.

17. The method of measuring the hardness of a metallic workpiece having a substantially constant homogeneous composition, which comprises directing onto a surface of said workpiece a beam of beta radiation having an energy characteristic such that said workpiece presents an infinite thickness to said beam, detecting the reflected radiation returned backwardly from said surface to provide a first electrical signal proportional to the intensity of said reflected radiation, measuring the temperature of said workpiece to provide a second electrical signal which varies as a function of the temperature of the workpiece, electrically combining said first and second electrical signals to produce a third electrical signal which varies as a function of the hardness of said workpiece independently of temperature variations therein, and maintaining the density of the air through which said beam of beta radiation passes constant.

(References on following page)

References Cited by the Examiner

UNITED STATES PATENTS

| | | | |
|---|---|---|---|
| 2,809,638 | 10/1957 | Molins | 250—83.3 X |
| 2,938,124 | 5/1960 | Boyd | 250—83.3 |
| 2,968,727 | 1/1961 | Otis | 250—83.3 |
| 3,082,323 | 3/1963 | Chope et al. | 250—83.3 X |
| 3,122,782 | 3/1964 | Moore | 250—83.3 X |
| 3,148,278 | 9/1964 | Schonborn et al. | 250—83.3 X |
| 3,160,753 | 12/1964 | Varner | 250—83.6 |

OTHER REFERENCES

Your "Ray" Way to Better Control, by J. V. Ziemba, reprinted from Food Engineering, May, 1959, 4 pages.

RALPH G. NILSON, *Primary Examiner.*

ARCHIE R. BORCHELT, *Examiner.*